United States Patent Office 3,089,825
Patented May 14, 1963

3,089,825
PHARMACEUTICAL TABLET CONTAINING WHEAT GLUTEN
Ronald J. Brenner, Oreland, Pa., assignor to McNeil Laboratories, Incorporated, a corporation of Pennsylvania
No Drawing. Filed Nov. 2, 1959, Ser. No. 850,097
10 Claims. (Cl. 167—82)

This invention relates to a novel pharmaceutical tablet and to methods for its manufacture.

Two methods are commonly used for the manufacture of pharmaceutical tablets. One of these is the so-called "slugging process" which comprises the steps of mixing the various ingredients in powder form, subjecting the resulting dry mass to high pressure to produce large coherent slugs, milling the slugs into granules of desired size and recompressing the same into tablets in the conventional manner. The second, and perhaps more common, method for preparing tablet granulations is to wet the mixture of desired ingredients with water, alcohol or a hydroalcoholic solvent. The wet mass is spread on trays and placed in an oven to dry. The resulting material is then milled into granules of the required size, a lubricant is added and the mixture is compressed into tablets in the conventional manner.

In the wet granulation process described above, it is generally the practice to include in the wetting solution a suitable binder in order to ensure proper cohesion of the particles being compressed. A number of natural and synthetic substances are employed for this purpose, as for example, acacia, agar, tragacanth, alginates such as sodium alginate, glucose, polyvinylpyrrolidone, gelatin or starch.

The choice of binder in the preparation of pharmaceutical tablets is critical. This component, although quantitatively small with respect to the total weight of the final product, reflects directly on the compressibility of the granulation, strength of the granule, appearance and disintegration time of the tablet. Although the commonly known binders named above perform their primary function as cohesive agents, they fail to make any material contribution to the production of a tablet which would meet prevailing high standards relative to utility as well as appearance. Thus, the search has continued for a binder having a greater degree of versatility than those presently known to those skilled in the art.

It has now been discovered that the inclusion of gluten as a binding component in tablet granulations significantly improves the texture of the granules from the standpoint of strength, and contributes materially toward their compressibility, without in any way detracting from the disintegration time of the end product. In fact, it has been observed that tablets made from granulations containing gluten as a binder tend to have more uniform disintegration times than those without gluten. Moreover, gluten appears to improve the appearance of the tablet, in that dye materials are uniformly distributed throughout the mass, this being indirect evidence that the other components of the granulation are similarly distributed. Because of their superior nature, tablets made with gluten are excellent cores for coating by means familiar to those experienced in the art as for example, sugar-coating or enteric-coating with phenyl salicylate, cellulose acetate phthalate, shellac or similar materials. Finally, gluten is not responsible for producing any difficulties whatever in the mechanical stages of compression, such as pitting or jamming.

Gluten is a mixture of plant proteins naturally present in various types of cereal grains. For the purpose of the present invention, gluten obtained from wheat is preferred. It is produced by washing wheat flour with water until a product containing approximately 75% protein on a moisture-free basis results. It has been found advantageous to employ gluten which is substantially pure, that is to say, not denatured. Denaturing substances in gluten interfere with its agglomerating properties, reduce its elasticity and negate its function as an effective binder.

In accordance with the present invention, the desired amount of gluten is incorporated in the tablet formulation together with other ingredients, i.e., the active component, excipients, sweetening agents, dyes, etc. The mixture is thoroughly moistened with a suitable solvent such as water, alcohol, e.g., a lower alkanol or a hydroalcoholic mixture, to give a wetted mass which is then spread on trays to dry. The resulting granules are passed through a sieve of suitable mesh size, a lubricant is added and the tablets are compressed in the conventional manner.

The amount of gluten to be incorporated in the tableting formulation may vary from about 2% to about 20%, depending upon the nature of the therapeutically active ingredient as well as the fillers, and the amounts used. In actual practice, it has been found that from about 2% to about 10% is optimal, and it is this order of magnitude which is preferred.

It will be observed that the inclusion of gluten in tablet formulations does not preclude or interfere with the use of other, commonly known, binders such as one or more of those named hereinabove. Thus, depending upon the desires of one skilled in the art, gluten may be employed either as the sole binding component, or it may be used as one of several binding components. In the latter case, the gluten is incorporated in the dry, pre-wetted mixture as described above, and the second binder, such as gelatin, acacia or starch, suspended or dissolved in the wetting agent, is added thereto. Although it is not essential in all cases to do so, the advantage of using one or more conventional binders in addition to gluten, is that such binder combinations are of value when substances having peculiar physical properties, e.g., unusually high hydrophobicity, or resistance to compression are tableted—these characteristics making the preparation of an acceptable tablet peculiarly difficult. Such difficulties are sometimes encountered in cases where amorphous substances are being tabletted, although this is a generality rather than a rule.

That gluten is an extremely effective and widely adaptable binding agent in pharmaceutical tablet formulations will be at once apparent when it is noted that gluten is compatible with all known excipients and lubricants and can be employed in tableting a broad group of therapeutically active substances. Thus, gluten may be freely incorporated with starch, talc, lactose, kaolin, stearic acid, calcium stearate, sodium stearate, magnesium stearate, calcium phosphate and similar substances which act as excipients or lubricants, or both. Gluten is compatible with, and aids in the uniform distribution of, a large number of dyes and pigments, and is especially useful in conjunction with coal tar dyes.

Gluten may be employed in tableting a broad group of therapeutically active substances, either crystalline or amorphous in character, such as acetaminophen, butabarbital salts, dihydrocodeinone salts, tyrothricin, benzocaine, aspirin, calcium gluconate, acetophenetidin, caffeine, aluminum hydroxide, magnesium hydroxide, phenobarbital, homatropine salts, reserpine, carbinoxamine salts, ferrous sulfate, thiamine hydrochloride, zoxazolamine, cortisone, hydrocortisone, prednisone, prednisolone, chlorzoxazone, methamphetamine salts, liver extracts and similar medicinals commonly administered in tablet form. Thus, the application of gluten in the formulation of tablets embraces a considerable range of solid materials having a wide variety of pharmacodynamic properties such as muscle relaxants, antihistamines, sedatives, antiinflammatory agents, analgesics, central nervous system stimulants, etc.

The following examples are illustrative of the invention but are not intended to be a limitation thereon.

*Example I*

| | Percent |
|---|---|
| Zoxazolamine | 18–20 |
| Acetaminophen | 55–6 |
| Gluten | 2–4 |
| Color | 0.1–0.5 |
| Moisture | 1–2 |
| Lubricant | 0.5–1 |

Excipients and disintegrants, q.s. ad 100%.

The zoxazolamine, acetaminophen, gluten, color, excipients and disintegrants are mixed in a dry state and then granulated with an aqueous solution containing about 18% gelatin, screened and dried. The dried granules are screened again, lubricant (0.5–1% based on total weight of granulation) is admixed and the resulting mixture is tableted.

*Example II*

| | Percent |
|---|---|
| Chlorzoxazone | 19–21 |
| Acetaminophen | 48–53 |
| Gluten | 3–5 |
| Moisture | 0.5–2 |
| Color | 0.1–0.3 |
| Lubricant | 0.5–1 |

Excipients and disintegrants, q.s. ad 100%.

The chlorzoxazone, acetaminophen, gluten, color, excipients and disintegrants are mixed in a dry state, granulated with an aqueous solution containing about 18% gelatin, screened and dried. The dried granules are screened again, lubricant (0.5–1% based on total weight of granulation) is admixed and the resulting mixture is tableted.

*Example III*

| | Percent |
|---|---|
| Butabarbital sodium | 5–10 |
| Gluten | 2–4 |
| Moisture | 1–2 |
| Lubricant | 0.5–1 |

Excipients and disintegrants, q.s. ad 100%.

The butabarbital sodium, gluten, excipients and disintegrants are mixed in a dry state, granulated with distilled water, screened and dried. The dried granules are screened again, lubricant (0.5–1% based on total weight of granulation) is admixed and the resulting mixture is tableted.

*Example IV*

| | Percent |
|---|---|
| Thyroid | 4–5 |
| Liver, desiccated | 34–36 |
| Thiamine mononitrate | 0.1–0.2 |
| Riboflavin | 0.1–0.2 |
| Niacinamide | 1–2 |
| Vitamine $B_{12}$ | 0.0001–0.0002 |
| Gluten | 3–5 |
| Moisture | 1–2 |
| Lubricants | 3–5 |

Excipients, q.s. ad 100%.

The thyroid, desiccated liver, gluten and excipients are mixed in the dry state, granulated with an aqueous solution containing about 18% gelatin, screened and dried. The dried granules are screened again, thiamine mononitrate, riboflavin, niacinamide, vitamin $B_{12}$, and lubricants are admixed and the composition is tableted.

The resulting tablet is sugar-coated in a manner familiar to those experienced in the art.

What is claimed is:

1. An improved pharmaceutical tablet comprising a solid, therapeutically active substance, excipients, a lubricant, and from about 2% to about 20% undenatured wheat gluten.

2. An improved pharmaceutical tablet comprising a solid, therapeutically active substance, excipients, a lubricant and a mixture of binders, at least one of which is undenatured wheat gluten in an amount from about 2% to about 20%.

3. An improved tablet granulation comprising a solid, therapeutically active substance, excipients, and from about 2% to about 20% undenatured wheat gluten.

4. An improved, compressed, pharmaceutical tablet comprising zoxazolamine and acetaminophen as the therapeutically active substances, excipients, a lubricant and from about 2% to about 20% undenatured wheat gluten.

5. An improved, compressed, pharmaceutical tablet comprising chlorzoxazone and acetaminophen as the therapeutically active substances, excipients, a lubricant and from about 2% to about 20% undenatured wheat gluten.

6. An improved, compressed pharmaceutical tablet comprising butabarbital sodium as the therapeutically active substance, excipients, a lubricant and from about 2% to about 20% undenatured wheat gluten.

7. An improved, compressed, pharmaceutical tablet useful as a core for preparing coated tablets comprising therapeutic agents, excipients, lubricants and from about 2% to about 20% undenatured wheat gluten.

8. An improved, compressed, pharmaceutical tablet comprising thyroid, desiccated liver, thiamine mononitrate, riboflavin, niacinamide and vitamin $B_{12}$ as the therapeutically active substances, excipients, lubricants, and from about 2% to about 20% undenatured wheat gluten.

9. An improved sugar-coated pharmaceutical tablet having a core comprising a solid, therapeutically active substance, excipients, a lubricant and from about 2% to about 20% undenatured wheat gluten.

10. An improved enteric-coated pharmaceutical tablet comprising a solid, therapeutically active substance, excipients, a lubricant and from about 2% to about 20% undenatured wheat gluten.

References Cited in the file of this patent
UNITED STATES PATENTS

| | | |
|---|---|---|
| 2,469,861 | Cohoe | May 10, 1949 |
| 2,508,477 | Stievater et al. | May 23, 1950 |
| 2,559,551 | Weber | July 3, 1951 |
| 2,582,965 | Coffman | Jan. 22, 1952 |
| 2,774,710 | Thompson | Dec. 18, 1956 |
| 2,836,540 | Hardt | May 27, 195 |